United States Patent [19]
Kauffman, Jr. et al.

[11] Patent Number: 5,873,582
[45] Date of Patent: Feb. 23, 1999

[54] CONVERTIBLE HUNTING UTILITY CART

[76] Inventors: Donald J. Kauffman, Jr., 5825 Buchanan Trail East; Kenneth M. Leatherman, 8710 Capitol Hill Rd., both of Waynesboro, Pa. 17268-9572

[21] Appl. No.: 804,471

[22] Filed: Feb. 21, 1997

[51] Int. Cl.⁶ .................................................. A63C 17/18
[52] U.S. Cl. ........................................ 280/7.12; 280/643
[58] Field of Search ............................... 280/7.12, 7.13, 280/638, 639, 641, 643, 645, 651, 652, 648, 47.17, 47.18, 47.24, 47.371, 47.34, 47.35, 79.2, 79.3, 30, 32, 63

[56] References Cited

U.S. PATENT DOCUMENTS

| | | | |
|---|---|---|---|
| 1,658,302 | 2/1928 | Renaud | 280/7.12 |
| 2,062,800 | 12/1936 | Shreffler | 280/7.13 |
| 2,473,296 | 6/1949 | O'Connor | 280/7.12 |
| 4,498,688 | 2/1985 | Walters | 280/7.13 |

Primary Examiner—Robert J. Oberleitner
Assistant Examiner—C. T. Bartz

[57] ABSTRACT

A convertible hunting utility cart including a frame portion. A pair of wheels are rotatably coupled with the frame portion. A U-shaped handle is pivotally and removably coupled with the frame portion. A hitch portion is couplable to the frame portion. A sled portion is couplable to the frame portion between the pair of wheels.

9 Claims, 3 Drawing Sheets

CONVERTIBLE HUNTING UTILITY CART

BACKGROUND OF THE INVENTION

1. Field of the Invention

The present invention relates to a convertible hunting utility cart and more particularly pertains to transporting game and gear while hunting with a convertible hunting utility cart.

2. Description of the Prior Art

The use of hunter carts is known in the prior art. More specifically, hunter carts heretofore devised and utilized for the purpose of aiding a hunter while hunting are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,295,556 to Mullin discloses a multipurpose hunting cart.

U.S. Pat. No. 5,004,263 to Hubbard discloses a utility cart.

U.S. Pat. No. Des. 333,370 to Monk discloses the ornamental design for a hunter's cart.

U.S. Pat. No. Des. 327,968 to Wright discloses the ornamental design for a hunter's carrying cart.

U.S. Pat. No. Des. 312,716 to Stephens, III discloses the ornamental design for a hunters cart.

U.S. Pat. No. 5,351,976 to Penson discloses an equipment cart.

While these devices fulfill their respective, particular objective and requirements, the aforementioned patents do not describe a convertible hunting utility cart for transporting game and gear while hunting.

In this respect, the convertible hunting utility cart according to the present invention substantially departs from the conventional concepts and designs of the prior art, and in doing so provides an apparatus primarily developed for the purpose of transporting game and gear while hunting.

Therefore, it can be appreciated that there exists a continuing need for new and improved convertible hunting utility cart which can be used for transporting game and gear while hunting. In this regard, the present invention substantially fulfills this need.

SUMMARY OF THE INVENTION

In the view of the foregoing disadvantages inherent in the known types of hunter carts now present in the prior art, the present invention provides an improved convertible hunting utility cart. As such, the general purpose of the present invention, which will be described subsequently in greater detail, is to provide a new and improved convertible hunting utility cart and method which has all the advantages of the prior art and none of the disadvantages.

To attain this, the present invention essentially comprises a frame portion comprised of a pair of opposed side frames being connected by an end frame. Each of the side frames have a wheel guard extending upwardly from a central portion thereof. Each of the side frames has a wheel well extending outwardly from the central portion thereof. The wheel well has a width essentially equal to a width of the wheel guard. The frame portion further comprises a planar top member secured between the pair of opposed side frames. A plurality of cross bars extend between the side frames below the planar top member. The planar top member has a pair of posts extending downwardly therefrom. A pair of wheels are rotatably coupled with the pair of opposed side frames of the frame portion disposed within the wheel wells thereof. A U-shaped handle is pivotally and removably coupled with front ends of the pair of side frames of the frame portion. Free ends of the U-shaped handle have pivoting segments coupled therewith. Free ends of the pivoting segments are pivotally and removably coupled with the pair of side frames inwardly of the front ends thereof. The device includes a hitch portion including a pair of side supports. Each of the supports have an elongated portion and an inwardly extending portion. Free ends of the elongated portions are couplable to the front ends of the pair of side frames of the frame portion. A support arm is pivotally coupled with one of the inwardly extending portions. Free ends of the inwardly extending portions are integral with a hitch. The device includes a sled portion including a pair of opposed ski portions. An H-shaped support bracket extends between the pair of ski portions. The H-shaped support bracket has open upper ends dimensioned for receiving the pair of posts therein whereby the ski portions are disposed inwardly of the pair of wheels. Lower ends of the H-shaped support bracket are secured to the skis by a pair of L-shaped brackets. Pairs of opposed angular braces extend from the upper ends of the H-shaped support bracket to the ski portions.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved convertible hunting utility cart which has all the advantages of the prior art hunter carts and none of the disadvantages.

It is another object of the present invention to provide a new and improved convertible hunting utility cart which may be easily and efficiently manufactured and marketed.

It is a further object of the present invention to provide a new and improved convertible hunting utility cart which is of durable and reliable construction.

An even further object of the present invention is to provide a new and improved convertible hunting utility cart which is susceptible of a low cost of manufacture with regard to both materials and labor, and which accordingly is then susceptible of low prices of sale to the consuming public, thereby making such a convertible hunting utility cart economically available to the buying public.

Even still another object of the present invention is to provide a new and improved convertible hunting utility cart for transporting game and gear while hunting.

Lastly, it is an object of the present invention to provide a new and improved convertible hunting utility cart including a frame portion. A pair of wheels are rotatably coupled with the frame portion. A U-shaped handle is pivotally and removably coupled with the frame portion. A hitch portion is couplable to the frame portion. A sled portion is couplable to the frame portion between the pair of wheels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
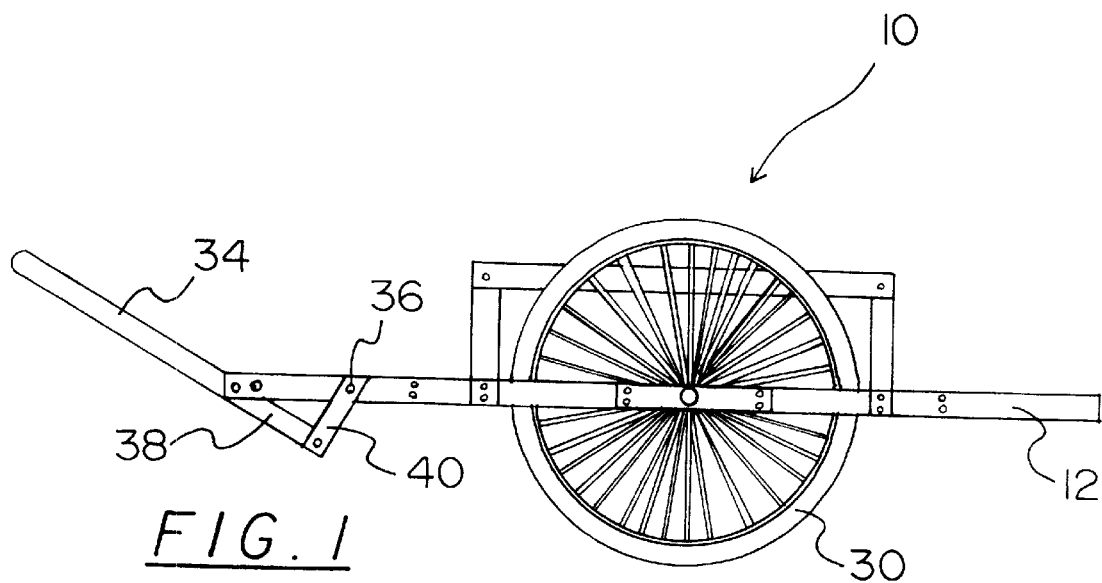
FIG. 1 is a side view of the preferred embodiment of the convertible hunting utility cart constructed in accordance with the principles of the present invention.
Figure 2:
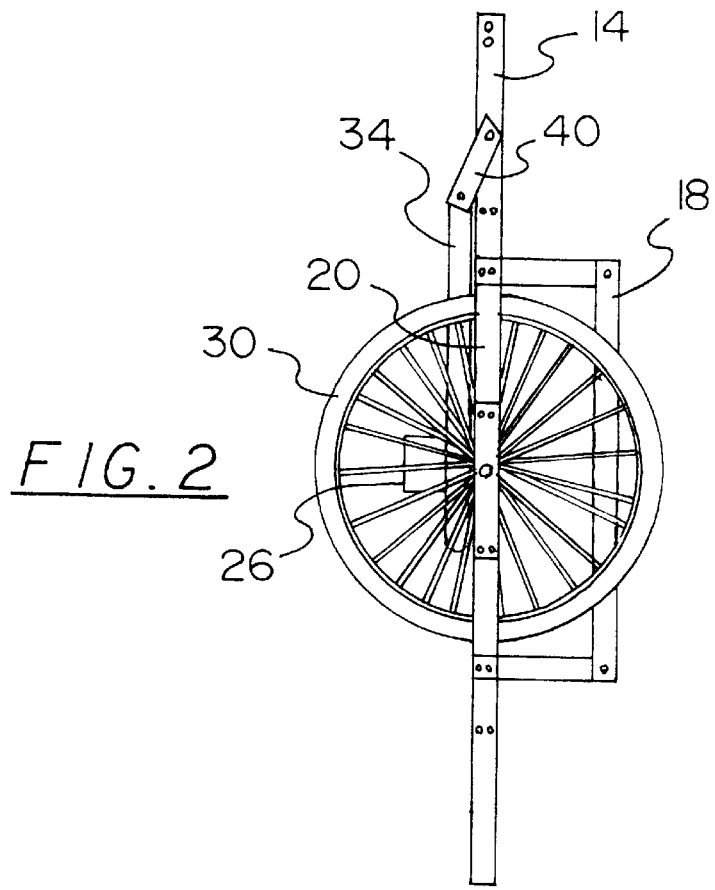
FIG. 2 is a side elevation view of the cart in a folded orientation.
Figure 3:
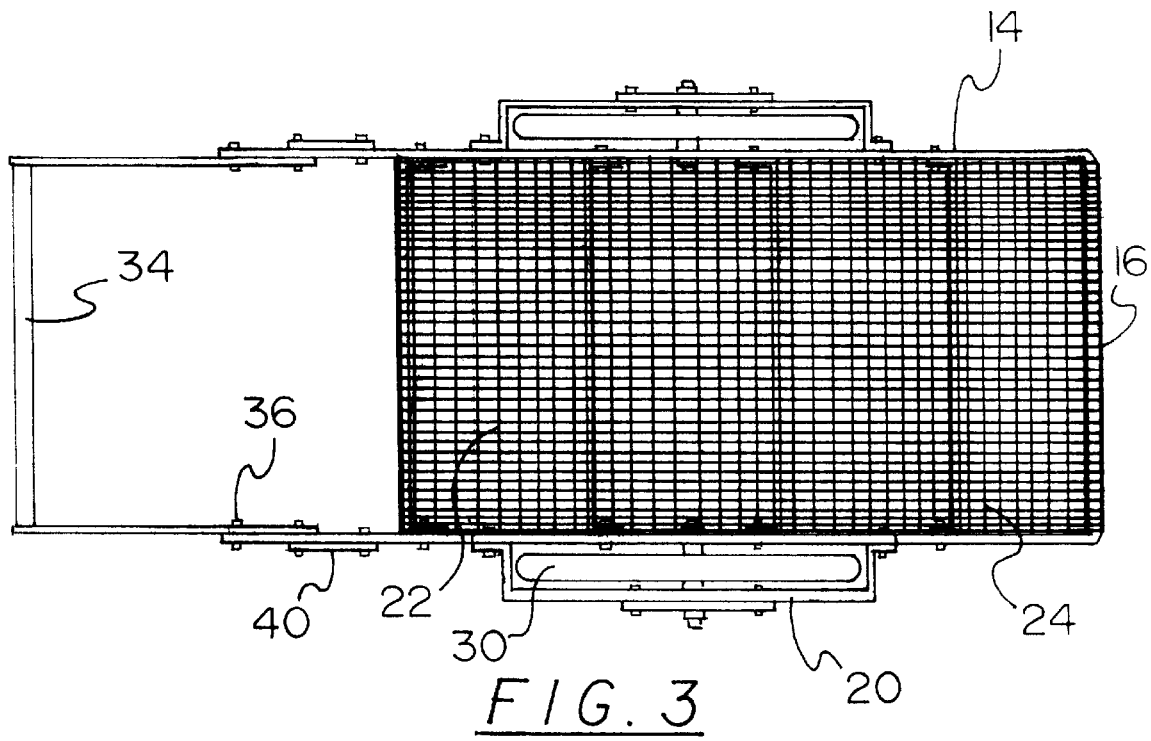
FIG. 3 is a top plan view of the present invention in an extended orientation.
Figure 4:
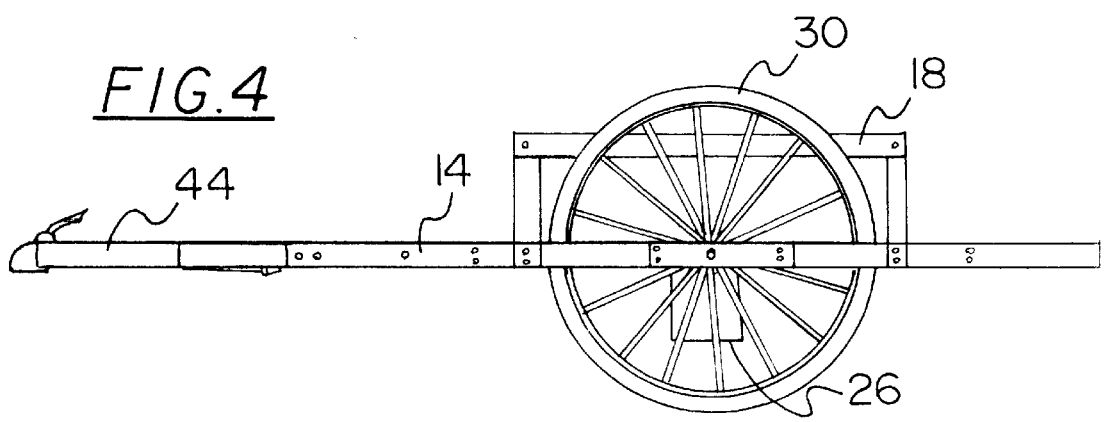
FIG. 4 is a side elevation view of the present invention with the trailer hitch attachment.
Figure 5:
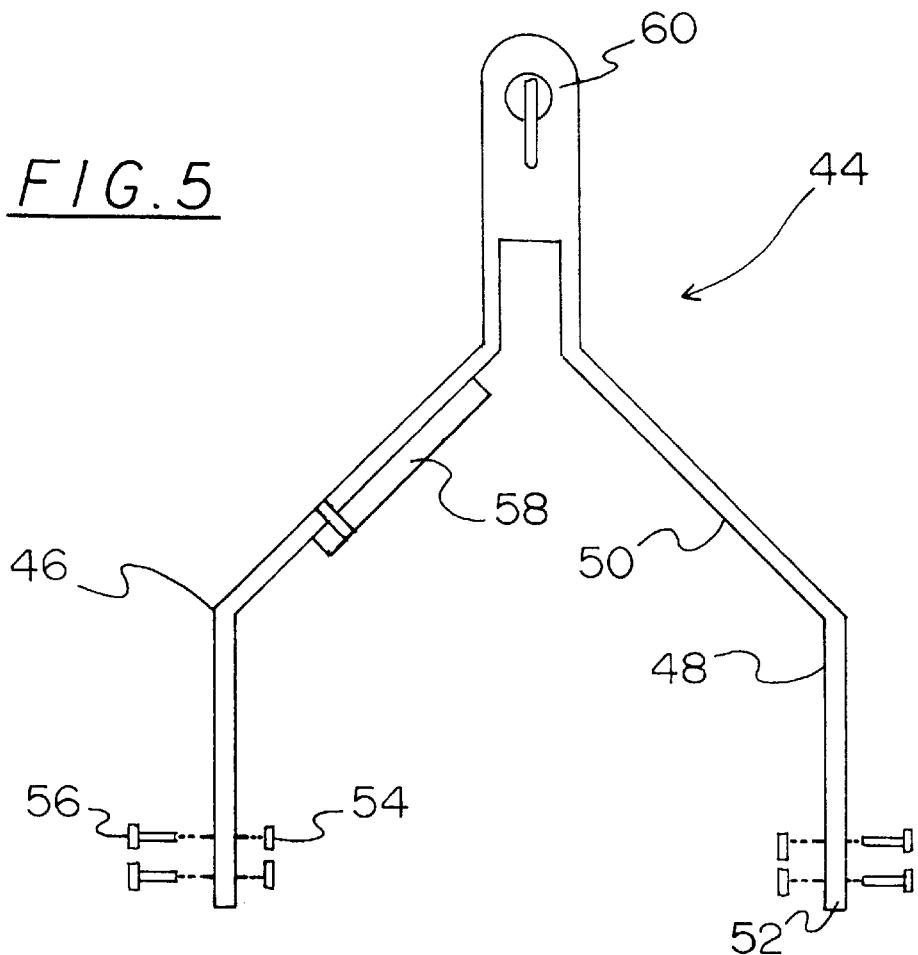
FIG. 5 is a to plan view of the trailer hitch attachment of the present invention.
Figure 6:
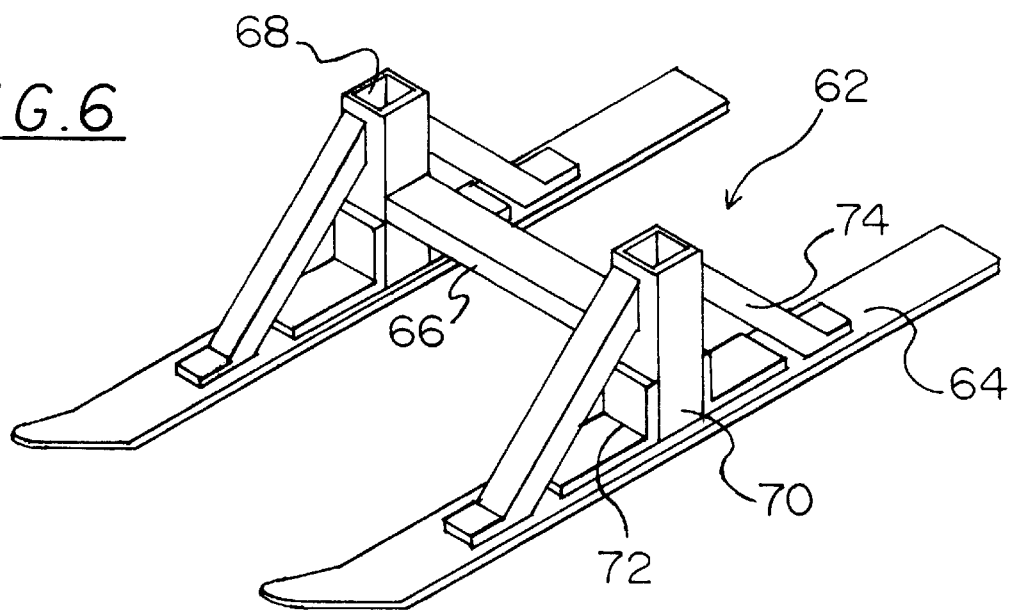
FIG. 6 is a perspective view of the skid attachment of the present invention.

With reference now to the drawings, and in particular, to FIGS. 1 through 6 thereof, the preferred embodiment of the new and improved convertible hunting utility cart embodying the principles and concepts of the present invention and generally designated by the reference number 10 will be described.

Specifically, it will be noted in the various Figures that the device relates to a convertible hunting utility cart for transporting game and gear while hunting. In its broadest context, the device consists of a frame portion, a pair of wheels, a hitch portion and a sled portion. Such components are individually configured and correlated with respect to each other so as to attain the desired objective.

The device 10 includes a frame portion 12 comprised of a pair of opposed side frames 14 being connected by an end frame 16. Each of the side frames 14 have a wheel guard 18 extending upwardly from a central portion thereof. Each of the side frames 14 has a wheel well 20 extending outwardly from the central portion thereof. The wheel well 20 has a width essentially equal to a width of the wheel guard 18. The frame portion 12 further comprises a planar top member 22 secured between the pair of opposed side frames 14. A plurality of cross bars 24 extend between the side frames 14 below the planar top member 22. The planar top member 22 has a pair of posts 26 extending downwardly therefrom. The planar top member 22 is preferably of a mesh configuration constructed of galvanized wire.

A pair of wheels 30 are rotatably coupled with the pair of opposed side frames 14 of the frame portion 12 disposed within the wheel wells 20 thereof. The pair of wheels are preferably of the type adaptable for use in snow, or in a flat and sandy terrain.

A U-shaped handle 34 is pivotally and removably coupled with front ends of the pair of side frames 14 of the frame portion 12. The coupling of the U-shaped handle with the frame portion is facilitated through the use of nuts and bolts 36 through apertures in the side frames 14 of the frame portion 12. Free ends 38 of the U-shaped handle 34 have pivoting segments 40 coupled therewith. Free ends of the pivoting segments 40 are pivotally and removably coupled with the pair of side frames 14 inwardly of the front ends thereof. As with the coupling of the U-shaped handle 34 to the side frames 14, the coupling of the pivoting segments 40 to the side frames 14 is facilitated through the use of nuts and bolts 36. The U-shaped handle 34 allows for the manual transportation of the device 10.

Next, the device 10 includes a hitch portion 44 including a pair of side supports 46. Each of the supports 46 have an elongated portion 48 and an inwardly extending portion 50. Free ends 52 of the elongated portions are couplable to the front ends of the pair of side frames 14 of the frame portion 12 by nuts 54 and bolts 56. A support arm 58 is pivotally coupled with one of the inwardly extending portions 50. Free ends of the inwardly extending portions 50 are integral with a hitch 60. Attachment of the hitch portion 44 is achieved after the U-shaped handle 34 has been removed. The hitch portion 44 is designed to allow the device 10 to be attached to a tractor or an ATV to pull the device 10 when manual transport is not desired. The support arm 58 is used as a prop for when the hitch portion 44 is attached to the frame portion 12 and the device is stationary. The support arm 58 will support the device 10 so that the hitch 60 does not contact a ground area.

Lastly, the device 10 includes a sled portion 62 including a pair of opposed ski portions 64. An H-shaped support bracket 66 extends between the pair of ski portions 64. The H-shaped support bracket 66 has open upper ends 68 dimensioned for receiving the pair of posts 26 therein whereby the ski portions 64 are disposed inwardly of the pair of wheels 30. Lower ends 70 of the H-shaped support bracket 66 are secured to the skis 64 by a pair of L-shaped brackets 72. Pairs of opposed angular braces 74 extend from the upper ends of the H-shaped support bracket 66 to the ski portions 64. The L-shaped brackets 72 and the angular braces 74 act as means of support while transporting the device 10. The use of the sled portion 92 is ideal in wintery conditions when the wheels 30 will be rendered ineffective.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A convertible hunting utility cart for transporting game and gear while hunting comprising, in combination:
   a frame portion comprised of a pair of opposed side frames being connected by an end frame, each of the side frames having a wheel guard extending upwardly from a central portion thereof, each of the side frames having a wheel well extending outwardly from the central portion thereof, the wheel well having a width essentially equal to a width of the wheel guard, the frame portion further comprising a planar top member secured between the pair of opposed side frames, a plurality of cross bars extend between the side frames below the planar top member, the planar top member having a pair of posts extending downwardly therefrom;
   a pair of wheels rotatably coupled with the pair of opposed side frames of the frame portion disposed within the wheel wells thereof;
   a U-shaped handle pivotally and removably coupled with front ends of the pair of side frames of the frame portion, free ends of the U-shaped handle having pivoting segments coupled therewith, free ends of the pivoting segments pivotally and removably coupled with the pair of side frames inwardly of the front ends thereof;
   a hitch portion including a pair of side supports, each of the supports having an elongated portion and an inwardly extending portion, free ends of the elongated portions couplable to the front ends of the pair of side frames of the frame portion, a support arm pivotally coupled with one of the inwardly extending portions, free ends of the inwardly extending portions integral with a hitch; and
   a sled portion including a pair of opposed ski portions, an H-shaped support bracket extends between the pair of ski portions, the H-shaped support bracket having open upper ends dimensioned for receiving the pair of posts therein whereby the ski portions are disposed inwardly of the pair of wheels, lower ends of the H-shaped support bracket secured to the skis by a pair of L-shaped brackets, pairs of opposed angular braces extend from the upper ends of the H-shaped support bracket to the ski portions.

2. A convertible hunting utility cart comprising:
   a frame portion;
   a pair of wheels rotatably coupled with the frame portion;
   a U-shaped handle pivotally and removably coupled with the frame portion;
   a hitch portion couplable to the frame portion; and
   a sled portion couplable to the frame portion between the pair of wheels, the sled portion including a pair of generally planar opposed ski portions, an H-shaped support bracket extends between the pair of ski portions.

3. The convertible hunting utility cart as set forth in claim 2 wherein the frame portion comprised of a pair of opposed side frames being connected by an end frame, each of the side frames having a wheel guard extending upwardly from a central portion thereof, each of the side frames having a wheel well extending outwardly from the central portion thereof for receiving the pair of wheels therein.

4. The convertible hunting utility cart as set forth in claim 3 wherein the frame portion further comprising a planar top member secured between the pair of opposed side frames, a plurality of cross bars extend between the side frames below the planar top member, the planar top member having a pair of posts extending downwardly therefrom for coupling with the sled portion.

5. The convertible hunting utility cart as set forth in claim 4 wherein the U-shaped handle pivotally and removably coupled with front ends of the pair of side frames of the frame portion.

6. The convertible hunting utility cart as set forth in claim 5 wherein free ends of the U-shaped handle having pivoting segments coupled therewith, free ends of the pivoting segments pivotally and removably coupled with the pair of side frames inwardly of the front ends thereof.

7. The convertible hunting utility cart as set forth in claim 4 wherein the H-shaped support bracket having open upper ends dimensioned for receiving the pair of posts therein whereby the ski portions are disposed inwardly of the pair of wheels.

8. The convertible hunting utility cart as set forth in claim 7 wherein lower ends of the H-shaped support bracket secured to the skis by a pair of L-shaped brackets.

9. The convertible hunting utility cart as set forth in claim 8 wherein pairs of opposed angular braces extend from the upper ends of the H-shaped support bracket to the ski portions.

* * * * *